United States Patent [19]

Tamura

[11] Patent Number: 5,717,945
[45] Date of Patent: Feb. 10, 1998

[54] METHOD FOR CREATING DOCUMENTS WITH AN OPEN DOCUMENT ARCHITECTURE

[75] Inventor: Hiroshi Tamura, Sagamihara, Japan

[73] Assignee: Ricoh Company, Ltd., Tokyo, Japan

[21] Appl. No.: 596,779

[22] Filed: Feb. 5, 1996

Related U.S. Application Data

[63] Continuation of Ser. No. 149,836, Nov. 10, 1993, abandoned.

[30] Foreign Application Priority Data

| Nov. 12, 1992 | [JP] | Japan | 4-326274 |
| Dec. 18, 1992 | [JP] | Japan | 4-354884 |
| Apr. 30, 1993 | [JP] | Japan | 5-124719 |

[51] Int. Cl.$^6$ .................................................. G06F 15/20
[52] U.S. Cl. ............... 395/800; 395/779; 395/786; 395/791; 395/792; 364/419.1; 364/419.14; 364/141.17; 364/419.19; 364/DIG. 1
[58] Field of Search ..................... 395/761, 776, 395/780, 786, 792, 793, 807, 800, 779, 791; 364/419.1, DIG. 1, 419.14, 419.17, 419.19

[56] References Cited

U.S. PATENT DOCUMENTS

| 4,723,210 | 2/1988 | Barker et al. | 395/147 |
| 4,792,648 | 12/1988 | Ogasawara | 178/4 |
| 4,829,385 | 5/1989 | Takezawa | 358/433 |
| 4,959,769 | 9/1990 | Cooper et al. | 395/600 |
| 5,003,499 | 3/1991 | Fujiwara et al. | 395/146 |
| 5,113,492 | 5/1992 | Ariki et al. | 395/147 |
| 5,129,061 | 7/1992 | Wang et al. | 395/200 |
| 5,144,555 | 9/1992 | Takadachi et al. | 364/419.17 |
| 5,181,162 | 1/1993 | Smith et al. | 361/699 |
| 5,201,047 | 4/1993 | Maki et al. | 395/600 |
| 5,253,181 | 10/1993 | Marui et al. | 395/146 |
| 5,313,526 | 5/1994 | Cheong | 382/176 |
| 5,359,673 | 10/1994 | de La Beaujaidiere | 382/229 |

*Primary Examiner*—Daniel H. Pan
*Assistant Examiner*—Dzung Nguyen
*Attorney, Agent, or Firm*—Lowe, Price, LeBlanc & Becker

[57] ABSTRACT

A method for controlling a document creation apparatus creates documents in accordance with an open document architecture. The documents contain one or more pages, with each of the pages containing one or more layout components. The method of the invention comprises the steps of selecting one page from a document being created; selecting a layout component from that one page in the document, the selected layout component forming a hierarchical component for the one page of the document; examining whether or not the selected layout component has a relationship with respect to another layout component; and setting a predetermined character string indicative of the relationship such that the predetermined character string is set in an attribute of the selected layout component in a form that may be read by a user, when the relationship exists. The steps of examining the relationship of the selected layout component with respect to another layout component and setting a predetermined character string in an attribute of the selected layout component are then repeated for all other layout components in the one page of the document; and then repeated for layout components in all other pages of the document. A layout component selected to be edited is then edited in accordance with a content of that layout component's predetermined character string.

14 Claims, 12 Drawing Sheets

"あいうえおかきくCRLF けこ・・・"

METHOD FOR CREATING DOCUMENTS WITH AN OPEN DOCUMENT ARCHITECTURE

This application is a continuation of application Ser. No. 08/149,836 filed Nov. 10, 1993 now abandoned.

The present invention generally relates to a control method of a document creation apparatus creating documents and document information in accordance with a formatted document architecture that belongs to a CCITT-defined open document architecture (ODA) or in accordance with a document application profile (DAP) that also belongs to the open document architecture.

In order to facilitate exchange of data between various information processing apparatuses such as personal computers or word processors, the CCITT T.410 recommendation defines a rule known as open document architecture (ODA).

In the open document architecture, a document has a structure defined hierarchically. More specifically, the document includes five hierarchically different components of: (a) document layout root; (b) page set; (c) page; (d) frame; and (e) block, wherein the foregoing components (a)–(e) are listed in the descending order of hierarchy. Further, there is provided a content part for the content of data in correspondence to each of the blocks. It should be noted that there may be a case wherein not all of foregoing components are contained in a document.

In the document shown in FIG. 1 which is transmitted between G4 facsimiles, each page of the document such as PAGE-1, PAGE-2, PAGE-3, ... contains a content part such as CONTENT-1, CONTENT-2, CONTENT-3, ... In the documents that are transmitted between mixed mode terminals, on the other hand, one or more blocks such as BLOCK-1, BLOCK-2, BLOCK-3, ... are included in each page such as PAGE1 of the document as indicated in FIG. 2, wherein each block includes one content part such as CONTENT-1, CONTENT-2, CONTENT-3, ... on the other hand, the document of FIG. 2 lacks the components such as a frame or page set.

In processable mode terminals, the document contains all of the components listed above as indicated in FIG. 3. Referring to FIG. 3, the document contains the page set such as PAGESET-1, PAGESET-2, PAGESET-3, ... , wherein each page set contains one or more pages such as PAGE-1, PAGE-2, PAGE-3, ... Further, each page contains one or more frames FRAME-A1, FRAME-A2, FRAME-A3, ... , wherein some of the frames may contain one or more lower hierarchical frames as in the case of the FRAME-A2 or FRAME-A3. It will be noted that the FRAME-A3 contains a hierarchically lower frame, FRAME-B2, while the FRAME-A3 contains hierarchically lower frames FRAME-B4 and FRAME-B5, the FRAME-B5 in turn contains lower frames, FRAME-C4 and FRAME-C5. Further, each frame contains one or more blocks such as BLOCK-1, BLOCK-2, BLOCK-3, ... , and each block contains one content part such as CONTENT-1, CONTENT-2, CONTENT-3, ...

It should be noted that the documents created by the processable mode terminal (the processable form documents and the formatted processable form documents) contain information specifying the physical as well as logical relationship between the hierarchical components in the form of the attribute of the component. Thus, one can edit the content of a transmitted document at the reception side terminal while maintaining the logical relationship between the blocks in the document. In other words, one can edit the processable form document as desired.

On the other hand, the documents of the mixed mode terminals lack the information representing the logical relationship between the hierarchical components, and because of this, such a document is difficult to edit in the reception side terminal, although such a document can be displayed in the reception side terminal in the form intended by the creator of the document.

In a document creation apparatus that creates documents and document information in compliance with the document application profile such as the mixed mode terminal or processable mode terminal, it is possible to edit the document information that includes character blocks having the formatted character content architecture. It should be noted that the formatted character content architecture is included in the foregoing document application profile, while the document application profile is included in the CCITT-defined open document architecture.

FIG. 4(A) shows a character block CBL as an example of the character block having the formatted character content architecture. The character block CBL is disposed on a suitable location of a page PG of the document as indicated in FIG. 4(A) with a suitable size, and includes characters in the form of a character data string as shown in FIG. 4(B). The character data string thereby forms a content part.

As indicated in FIG. 4(B), the character data string includes a hard carriage return code CRLF indicative of the carriage return, at a suitable location of the character data string. The code CRLF is typically represented by a suitable hexadecimal number such as OAODH, wherein the symbol H at the end of the code indicates that the number preceding the symbol H is a hexadecimal number.

When creating the documents having such a formatted character content architecture, therefore, it is necessary to insert efficiently the hard carriage return code at the suitable location of the character data string in the content part of each block. Further, such a hard carriage return code has to be removed when editing the document in a processable mode terminal. In this case too, the removal of the hard carriage return code has to be conducted efficiently.

SUMMARY OF THE INVENTION

Accordingly, it is a general object of the present invention to provide a novel and useful method for controlling a document creation apparatus, such that editing of documents created by the apparatus in accordance with the formatted document architecture can be conducted readily.

Another object of the present invention is to provide a method for controlling a document creation apparatus such that creation of blocks having the formatted character content architecture as well as edition of documents having such blocks are conducted efficiently.

Another object of the present invention is to provide a method for controlling a document creation apparatus for creating documents in accordance with a formatted document architecture that belongs to an open document architecture, said document containing one or more pages, each said page containing one or more layout components, comprising the step of:

selecting a layout component in each page of said document;

examining, in each page of said document, whether or not said selected layout component has a relationship with respect to another layout component; and setting, in each page of said document, a predetermined character string indicative of a relationship of said selected layout component to another said layout component included in said document, such that said predetermined character string is set in an attribute of said selected layout component in form readable by a user; said document creation apparatus thereby being used to edit a layout component having an attribute that contains said predetermined character string, in accordance with a content of said predetermined character string.

According to the present invention, the user of the document creation apparatus such as a mixed mode terminal can recognize the relationship between the layout components in the document, and the process for re-editing a document created previously and has been saved subsequently in a memory device can be implemented substantially easier. Thereby, movement of the content of the layout component such as a text between different layout components can be achieved easily.

In a preferred embodiment of the present invention, said character string represents a logical relationship between said layout component under consideration and another layout component in said document.

In another preferred embodiment of the present invention, said character string represents a physical, positional relationship between said layout component under consideration and another layout component in said document.

Another object of the present invention is to provide a method for controlling a document creation apparatus for creating a document in accordance with a document application profile that belongs to an open document architecture, said document containing one or more character blocks having a formatted character content architecture that belongs to said document application profile, said character blocks containing a character data train representing characters, said character blocks having a predetermined size and a predetermined character spacing defined in the direction of alignment of characters in said character block, comprising the step of:

inserting, upon completion of editing a document, a predetermined hard carriage return code into said character data train with a predetermined interval of characters defined for said character block in accordance with said predetermined size of said character block and said predetermined character spacing in said character block.

Another object of the present invention is to provide a method for controlling a document creation apparatus, said document creation apparatus creating a document in accordance with a document application profile that belongs to an open document architecture, said document containing one or more character blocks having a formatted character content architecture that belongs to said document application profile, said character blocks containing a character data train representing characters, said character blocks having a predetermined size and a predetermined character spacing defined in the direction of alignment of characters in said character block, comprising the step of:

removing a hard carriage return code from said character data train when re-editing said document, said hard carriage return code having been inserted into said character data train with a predetermined interval of characters defined for said character block in accordance with said predetermined size of said character block and said predetermined character spacing in said character block.

Another object of the present invention is to provide a method for controlling a document creation apparatus, said document creation apparatus creating a document in accordance with a document application profile that belongs to an open document architecture, said document containing one or more character blocks having a formatted character content architecture that belongs to said document application profile, said character blocks containing a character data train representing characters, said character blocks having a predetermined size and a predetermined character spacing defined in the direction of alignment of characters in said character block, comprising the steps of:

inserting, upon completion of editing a document, a predetermined hard carriage return code into said character data train with a predetermined interval of characters defined for said character block in accordance with said predetermined size of said character block and said predetermined character spacing in said character block; and removing said hard carriage return code from said character data train when re-editing said document.

According to the present invention, one can automatically remove the hard carriage return from the mixed mode document, which is transmitted with the hard carriage return for preserving the intended layout of the creator, and the document is converted to a form ready for re-editing with high efficiency. Thereby, the process for the user of the document creation apparatus to re-edit an existing document becomes substantially easier.

Other objects and further features of the present invention will become apparent from the following detailed description when read in conjunction with the attached drawings.

DETAILED DESCRIPTION OF PREFERRED EMBODIMENTS

Figure 1:
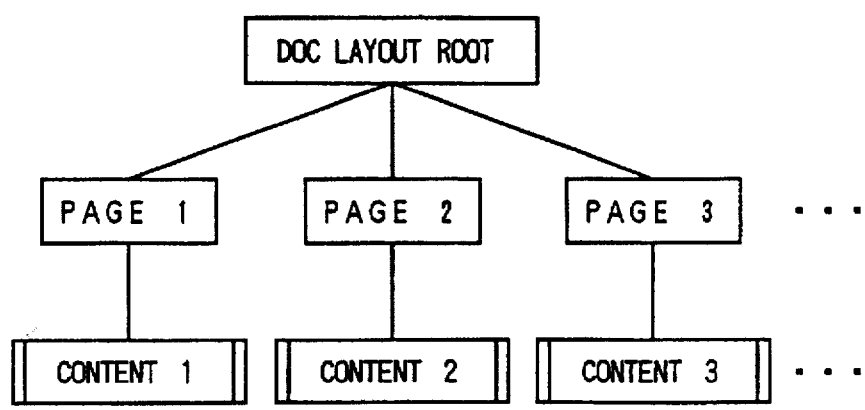
FIG. 1 is a diagram showing the architecture of document employed in a Group 4 facsimile apparatus.
Figure 2:
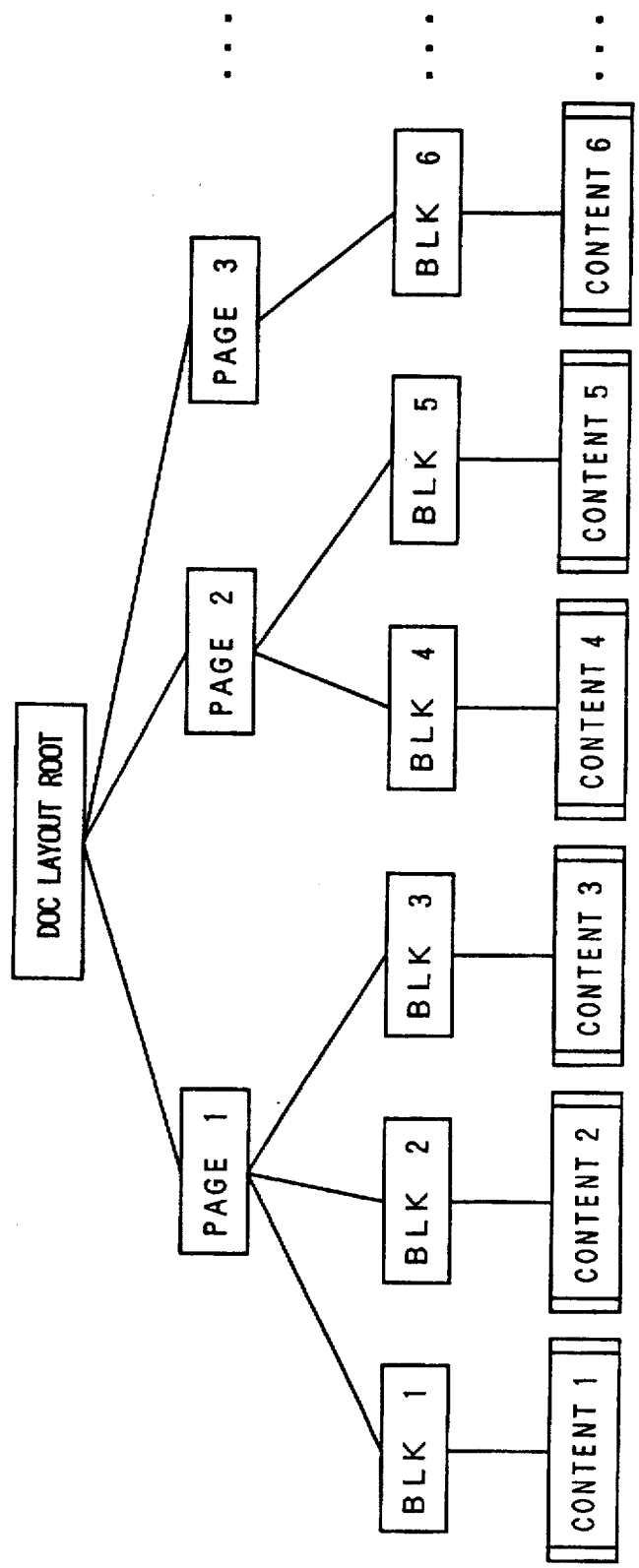
FIG. 2 is a diagram showing the architecture of document employed in a mixed mode terminal.
Figure 3:
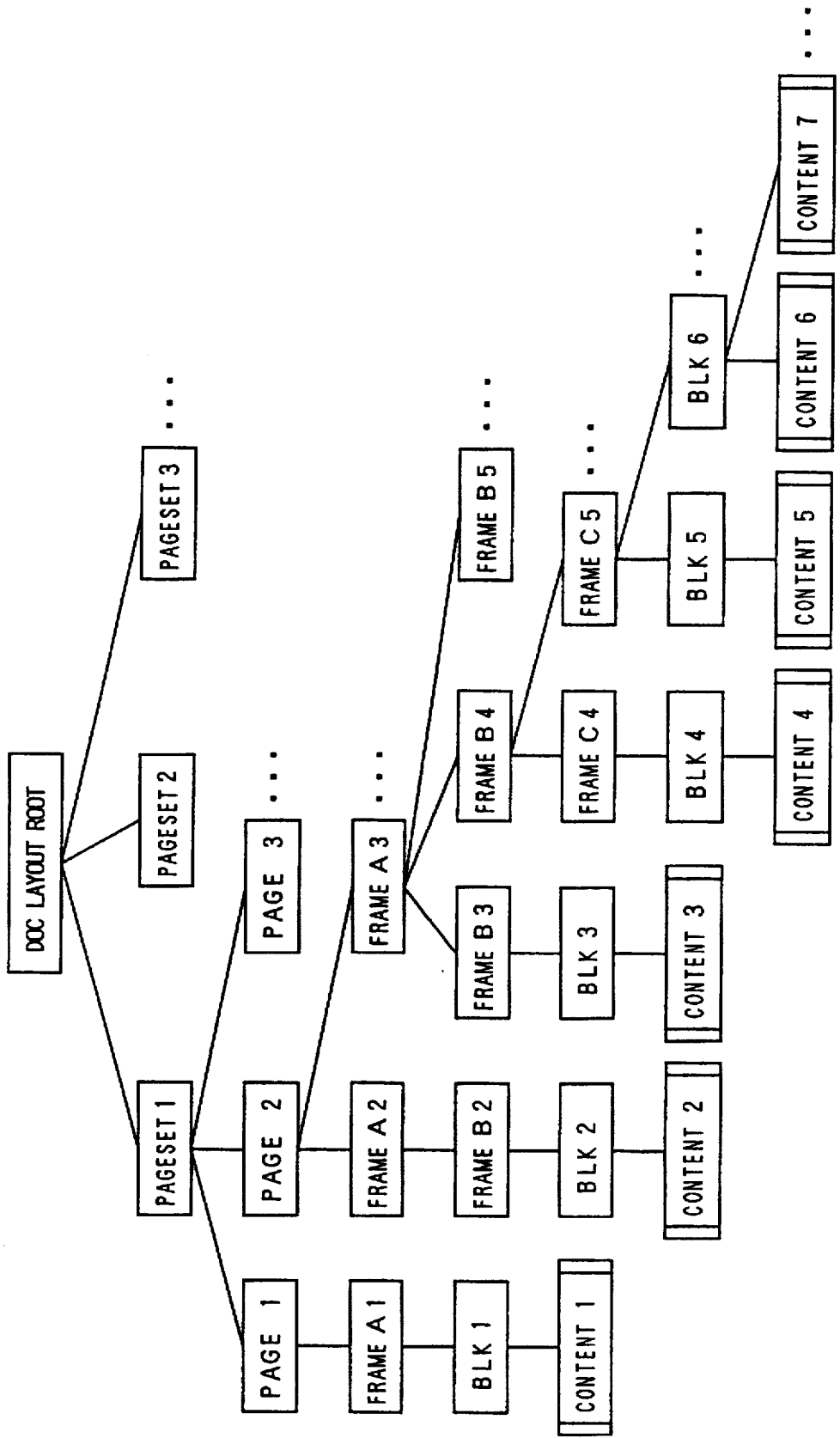
FIG. 3 is a diagram showing the architecture of document employed in a processable mode terminal.
Figure 4:
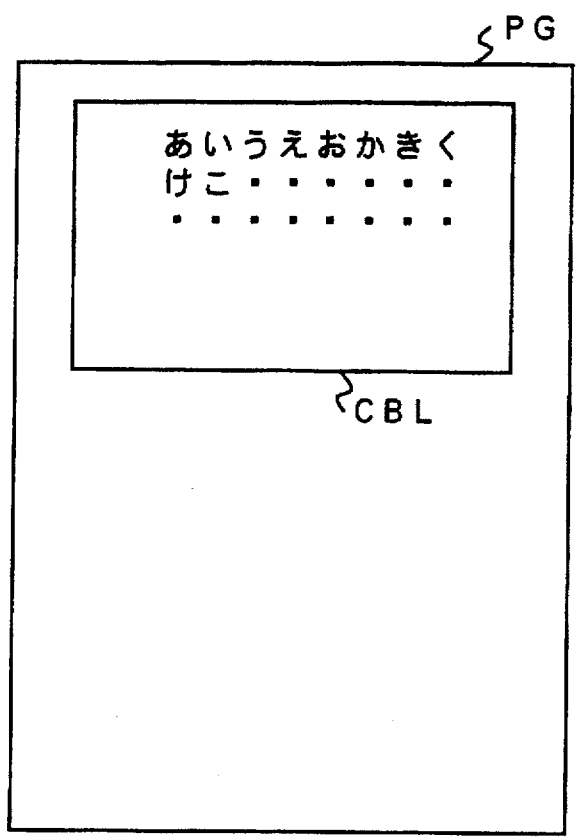
FIGS. 4(A) and 4(B) are diagrams showing an example of the character block in accordance with the formatted character content architecture.
Figure 5:
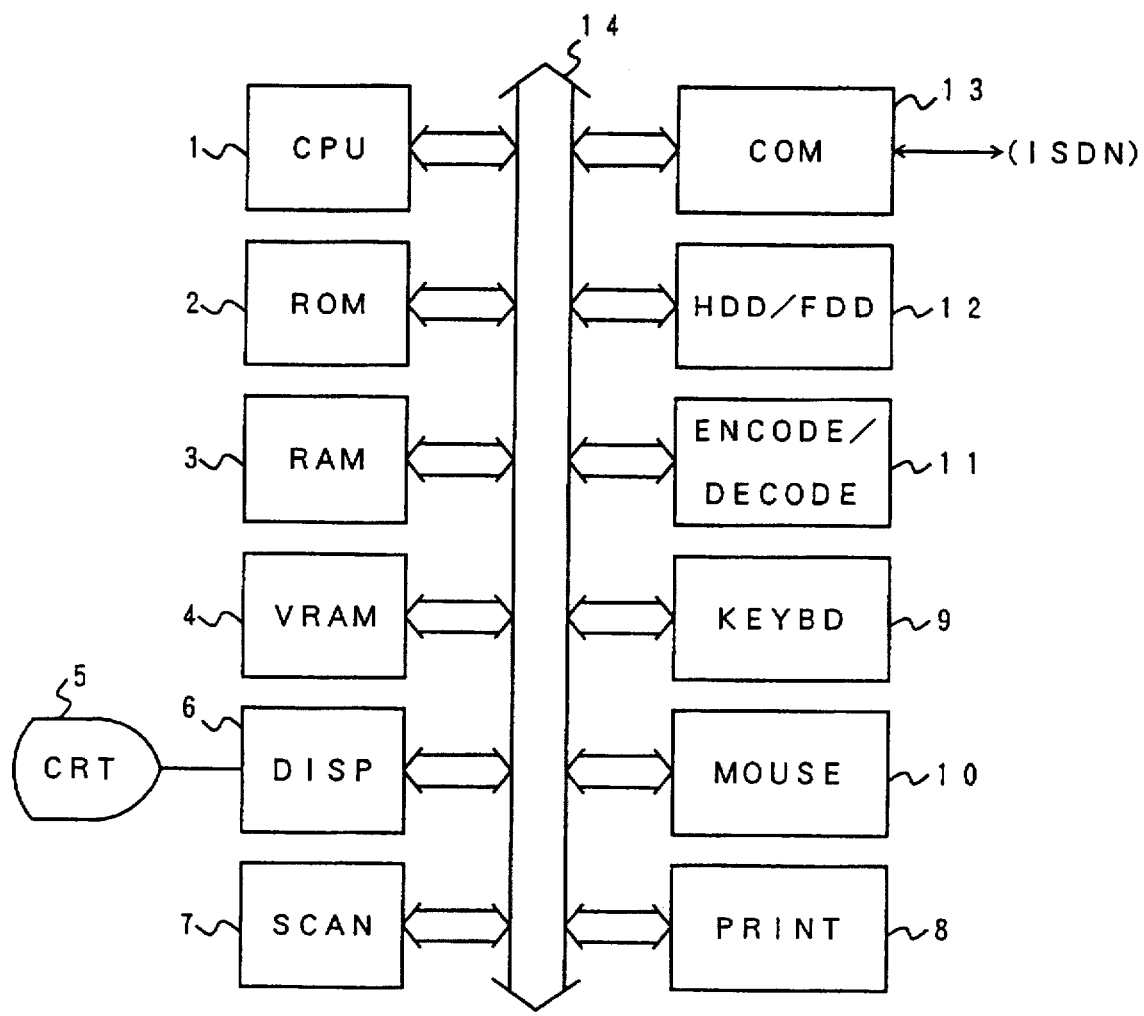
FIG. 5 is a block diagram showing the construction of a mixed mode terminal according to a first embodiment of the present invention.

FIG. 5 shows the construction of a mixed mode terminal of an integrated system digital network (ISDN) according to a first embodiment of the present invention.

Referring to FIG. 5, the mixed mode terminal includes a central processing unit (CPU) 1 for controlling the processing of the terminal. The CPU 1 cooperates with a read only memory (ROM) 2 for storing fixed data such as font data or a part of the control program conducted by the CPU 1, as well as with a random access memory 3 that provides a work area for the CPU 2.

The CPU1, the ROM 2 and the RAM 3 are connected with each other by a system bus 14, wherein the system bus 14 is further connected to a video RAM (VRAM) 4 for storing display data to be displayed on a cathode ray tube (CRT) 5 in the form of color bitmap data. The VRAM 4 has a storage capacity corresponding to at least two frames of the display data. The CRT 5 is controlled by a display control unit 6 that is connected also to the system bus 14 wherein the display control unit 6 receives the display data directly from the VRAM 4 via a separate bus.

The apparatus of FIG. 5 further includes a scanner 7 connected to the system bus 14 for acquiring image data from a sheet by scanning an image on the sheet and a printer 8 connected also to the bus 14 for recording images on a sheet with a predetermined resolution. Further, there is provided a keyboard 9 in electrical connection to the system bus 14 for inputting characters including various commands and texts, and a pointing device 10 is provided in electrical connection to the system bus 14 for pointing various parts on the screen of the CRT 5 for menu selection and other purposes.

In order to encode and decode image data (raster data) forming an image block to achieve data compression, there is provided an encode/decode unit 11 on the bus 14, and a magnetic disk device 12, also connected to the bus 14, stores various information such as the program to be carried out by the CPU 1, the transmission data file, reception data file, and the like. Further, there is provided a communication control unit 13 in electrical connection to the bus 14 and further to an ISDN for exchanging data with a remote telematique terminal such as the mixed mode terminal via the ISDN. The communication control unit 13 carries out various call control procedures and data transmission procedures.

The mixed mode terminal of FIG. 5 creates documents in which text and images are mixed up, by arranging the text and the images into respective rectangular blocks. The blocks are disposed at respective locations of a page with respective sizes in correspondence to the desired physical appearance of the document. On the other hand, the mixed mode documents thus created lacks any information for describing the logical relationship between the content parts of the blocks defined in the page. Thereby, the user has to judge the logical relationship between the blocks when re-editing a document, while such a process to establish the logical relationship between the blocks in a given, re-existing document, inevitably decreases the efficiency of document processing substantially.

In the present embodiment, the logical relationship between the frames or blocks in a page is described in the attribute of the blocks or frames in the form of user-readable comments. Thereby, the user can readily recognize the logical relationship between the blocks or frames and the efficiency of editing a document increases substantially.

The CCITT recommendation T.412 defines the "user-readable comments" as being an attribute formed of a sequence of characters representing a comment with regard to the constituting element of the document or a comment with regard to the content part. Further, the recommendation defines the character sequence as not forming a part of the document and being intended explicitly for recognition of human beings. Thus, the attribute does not have any significance to the reference model of layout or visualization processes defined in the T.412 recommendation or to any of the layout or visualization processes defined in other recommendations included in the T.410 series recommendation.

Figure 6:
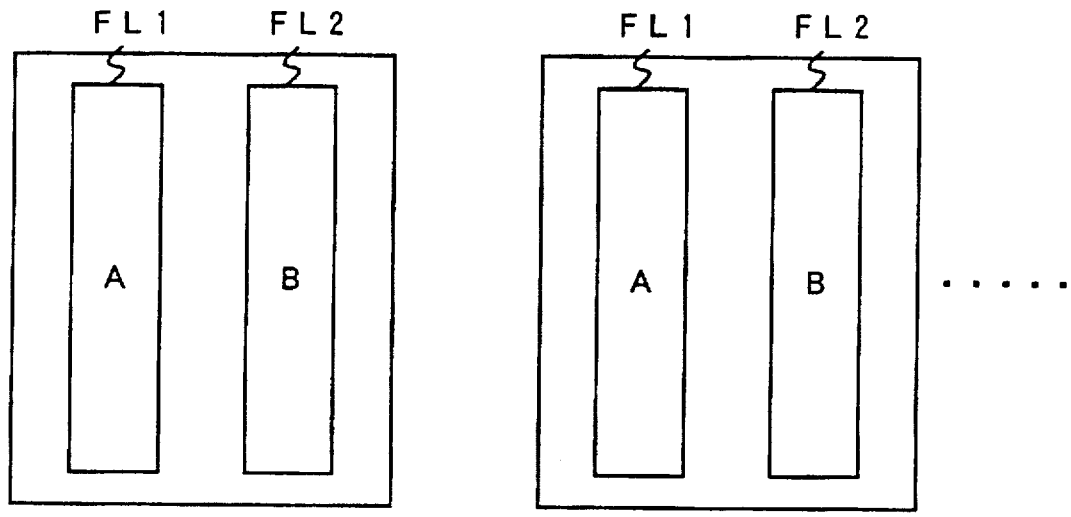
FIGS. 6(A), 6(B), 6(C), 6(D), 6(E), 6(F), 6(G), and 6(H) are diagrams showing an example of layout of blocks in a page.
Figure 6:
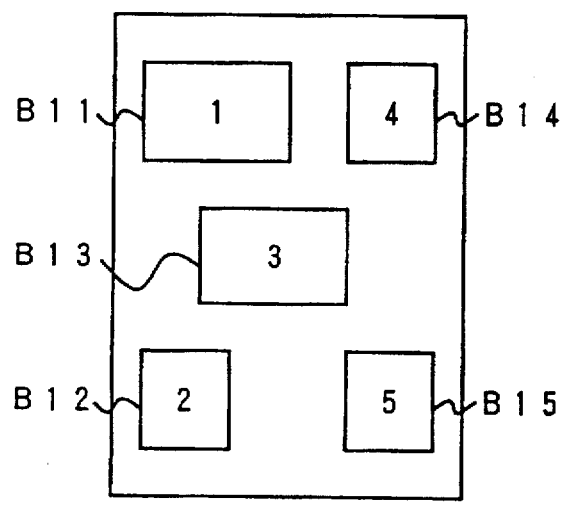
Figure 6:
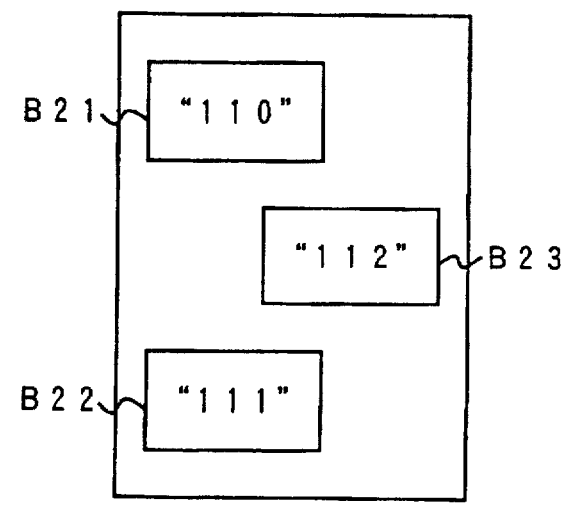
Figure 6:
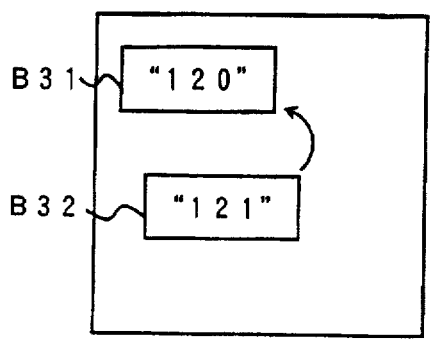
Figure 6:
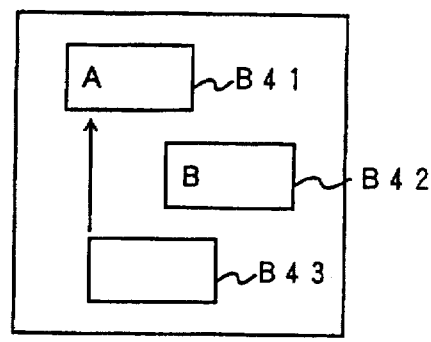
Figure 6:
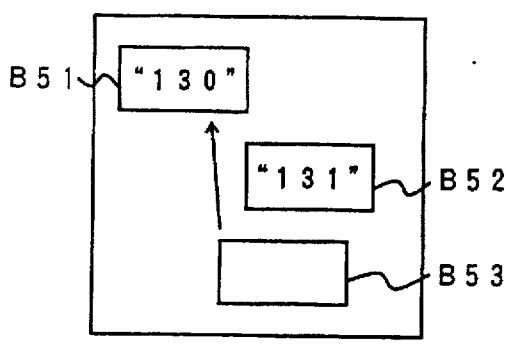
Figure 6:
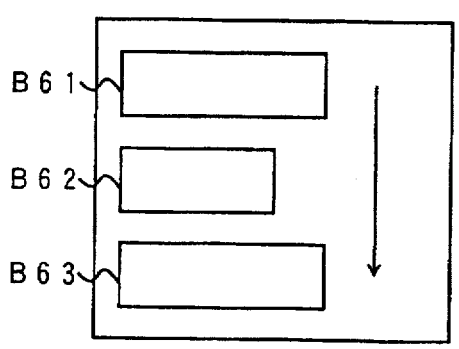
Figure 6:
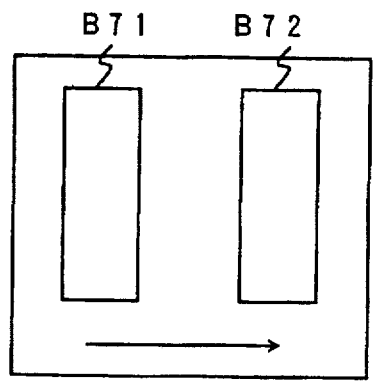

FIG. 6(A) shows an example of arrangement of the blocks in a page of a mixed mode document according to a first embodiment of the present invention. In the example of FIG. 6(A), text is laid out in the page of the document to form a two-column set including a left column and a right column, wherein the left column corresponds to a frame FL1 and a right column corresponds to a frame FL2. The frames FL1 and FL2 form the hierarchical component described before, wherein frame FL2 carries a character string "left of the two-column set (category A)" in the form of user-readable comment in the attribute, while the frame FL2 carries a character erring "right of the two-column set (category B)" as the attribute of the frames. Thereby, the user can recognize that the content of the frame FL2 continues to the content of the frame FL1, and that the content of the frame FL1 precedes the content of the frame FL2.

FIG. 6(B) shows another example of an arrangement of the blocks in a page of a document. Referring to FIG. 6(B), it will be noted that five blocks $B_{11}$–$B_{15}$ are arranged on the page, with respective attributes of "1," "2," . . . "5," represented in the form of user-readable comments, indicating that the content of the blocks $B_{11}$–$B_{15}$ continue to the content of other blocks in the order mentioned above.

FIG. 6(C) shows still other example of an arrangement of the blocks in FIG. 6(C). Referring to FIG. 6(C), it will be noted that laterally elongated rectangular blocks $B_{21}$, $B_{22}$ and $B_{23}$ are arranged in the vertical direction of a page of a document, wherein the blocks $B_{21}$, $B_{22}$ and $B_{23}$ carry character strings "110," "111" and "112" in the form of user-readable comment in the respective attributes, the character strings thereby representing the sequential object identifier order of the respective blocks. The character strings "110," "111" and "112" represent that the contents of the blocks continue in the order of $B_{21}$, $B_{22}$ and $B_{23}$.

FIG. 6(D) shows still other example of arrangement of the blocks in a page of a document. In the example of FIG. 6(D), two laterally elongated blocks $B_{31}$ and $B_{32}$ are disposed vertically in the page of the document, wherein the blocks $B_{31}$ and $B_{32}$ have respective object identifiers having the values of "120" and "121." Further, the block $B_{31}$ carries a character string "connected to block 120" in the form of user-readable comment in the attribute of the block. In this case, therefore, the user can recognize that the content of the block "121" follows the content of the block "120."

FIG. 6(E) shows still other example of an arrangement of the blocks in a page, wherein the page contains three blocks $B_{41}$, $B_{42}$ and $B_{43}$. The block $B_{41}$ carries a character string representing "category A" in attributes in the form of user-readable comments. Similarly, the block $B_{42}$ carries a character string representing "category A" in the attributes in the form of user-readable comments. Further, the block $B_{43}$ carries a character string representing "connection to A" in the attributes in the foam of user-readable comments. In this case, therefore, the user can recognize that the content of the block $B_{43}$ follows the content of the block $B_{41}$ and that the content of the block $B_{42}$ follows the content of the block $B_{43}$.

FIG. 6(F) shows still other example of arrangement of the blocks in a page, wherein the page contains three blocks $B_{51}$, $B_{52}$ and $B_{53}$. The blocks $s_1$ and $B_{52}$ carry respective object identifiers having the value of "130" and "131," while the block $B_{53}$ carries a character string "connected to the object identifier 130," in the form of user-readable comment in the attribute. Thereby, the user can recognize that the content of the blocks continue in increasing order of the y-coordinate value. In other words, one can recognize that the content of the block $B_{53}$ follow the content of the block $B_{51}$ and that the content of the block $B_{52}$ follows the content of the block $B_{53}$.

FIG. 6(G) shows still another example of the block arrangement in a page. In the example of FIG. 6(G), three laterally elongated blocks $B_{61}$, $B_{62}$ and $B_{63}$ are arranged generally vertically in the page. Further, the blocks $B_{61}$, $B_{62}$ and $B_{63}$ carry a character string of "continuing in the vertical directions" in the form of user-readable comment in the attribute. In this case, the user can recognize that the contents of the blocks continue in the order of the block $B_{61}$, the block $B_{62}$ and the block $B_{63}$.

FIG. 6(H) shows still another example of the block arrangement in a page. In the example of FIG. 6(H), vertically elongated blocks $B_{71}$ and $B_{72}$ are arranged laterally. The blocks $B_{71}$ and $B_{72}$ carry the character string "continuing from left to right" in the form of user-readable comment in the respective attributes, indicating that the content of the blocks continue in the increasing order of the x-coordinate.

In other words, the user can recognize that the content of the block $B_{72}$ follows the content of the block $B_{71}$.

In the embodiment of the present invention, the user can recognize the logical relationship between the blocks in a page based upon the user-readable comments set in the attribute of the blocks. Thereby, the user can re-edit the document efficiently by referring to the user-readable comments set in the attribute of each of the blocks.

Figure 7:
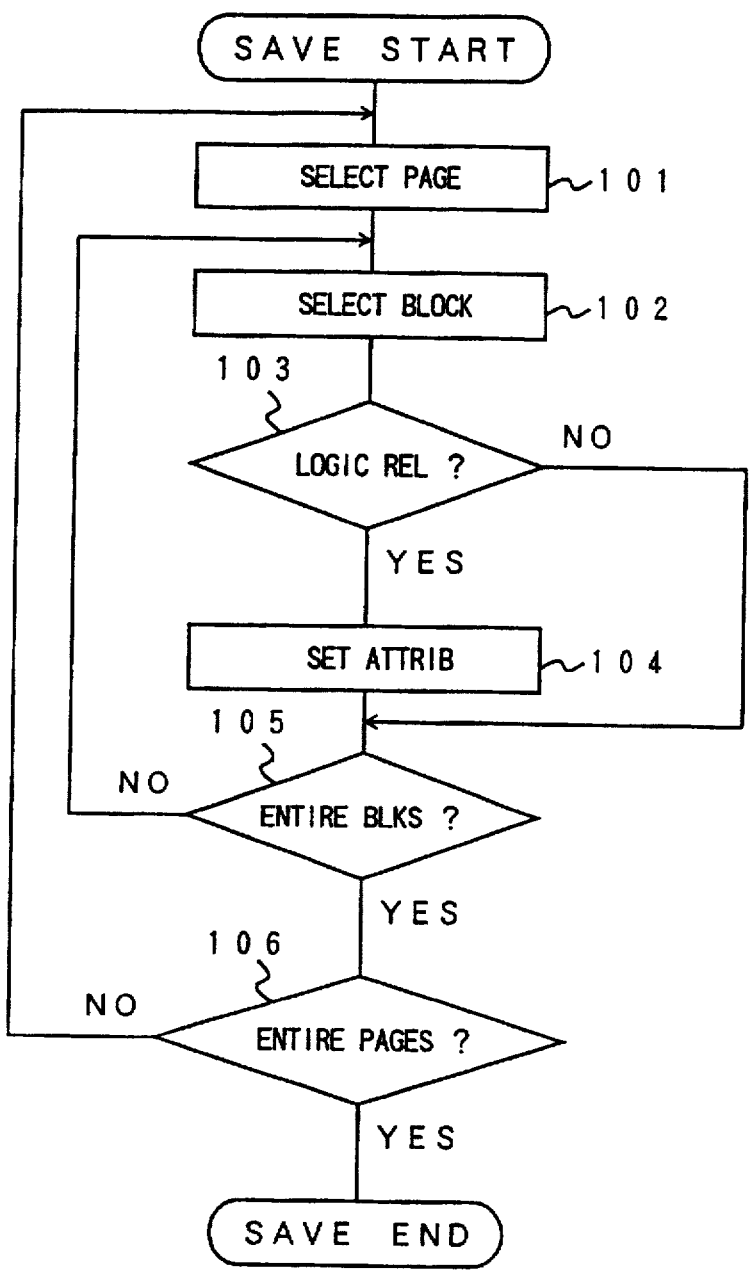
FIG. 7 is a flowchart showing an example of the processing when saving a created mixed mode document.

FIG. 7 shows an example of the saving process of a created or edited mixed mode document according to the present invention.

Referring to FIG. 7, an unprocessed page is selected in a step S101 and an unprocessed block in the selected page is selected in a step S102. Further, an examination is made in a step S103 whether or not a logical relationship exists with respect to other blocks for the selected block. In the step S103, the user is urged to input YES if there exists such a logical relationship while NO if such a relationship does not exist.

If the result of the step S103 is YES, a step S104 is carried out wherein the user is urged to input a character string indicative of the logical relationship, and the character string thus input is set in the attribute of the selected block in the form of the user-readable comment.

When the foregoing processes of the steps S103 and S104 are completed for one selected block, an examination is made in a step S105 whether or not all the blocks in the page are already processed. If the result of the step S105 is NO, the process returns to the step S105, wherein the processing for other blocks is repeated.

When the result of the step S105 is YES, on the other hand, an examination is made in a step S106 whether or not the processing for setting the attribute in the steps S103 and S104 are completed for all the pages of the document, and if the result of the step S106 is NO, the process returns to the step S101 for repeating the processing S102–S105 for the next page. On the other hand, when the result of the step S106 is YES, the saving process is finished.

According to the saving process of FIG. 7, it will be noted that the information indicative of the logical relationship between the blocks is set in the attribute of the blocks in the form of the user-readable comment.

Figure 8:
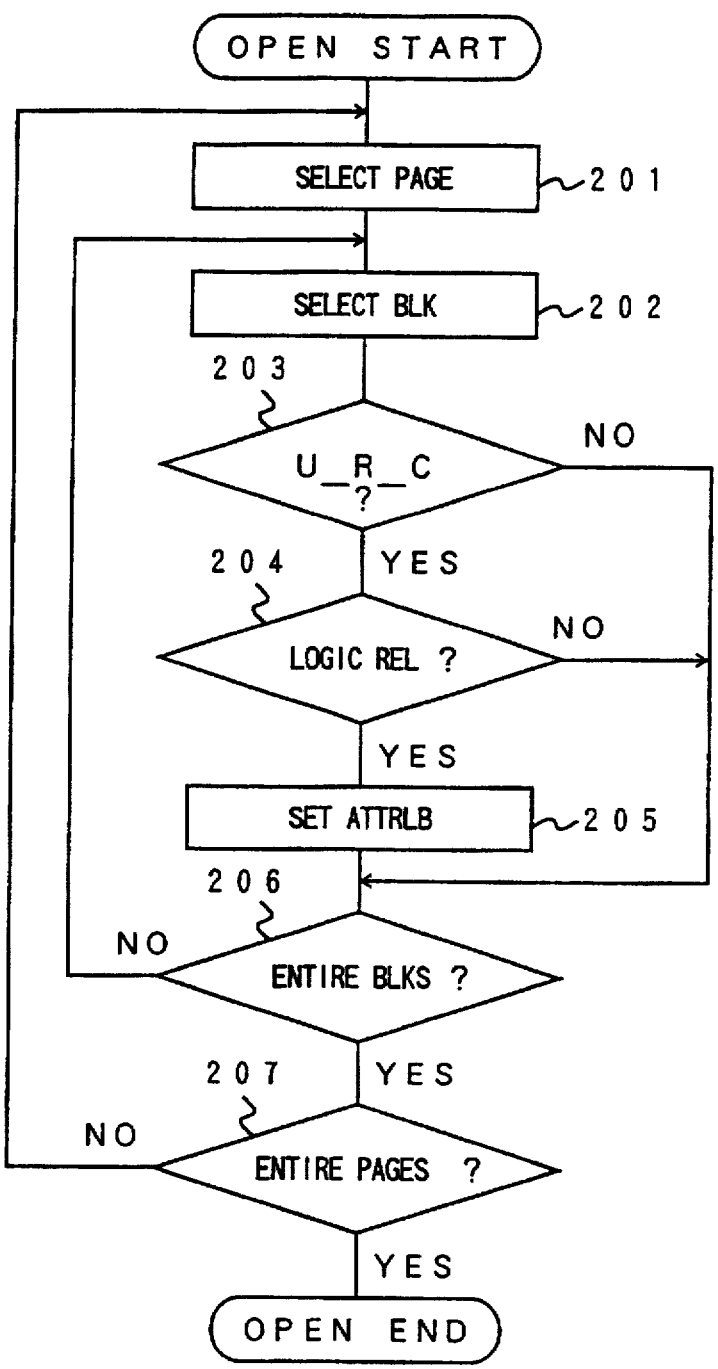
FIG. 8 is a flowchart showing an example of the preprocessing applied when re-editing a mixed mode document created previously and save in a memory device.

FIG. 8 shows a flowchart for opening a document that has been saved previously according to the process of FIG. 7, in order to re-edit the document. More specifically, FIG. 8 shows a process carried out previously to the step of transferring data of the opened file to an editing application program.

Referring to FIG. 8, an unprocessed page is selected in a step S201 and an unprocessed block is selected in the selected page in a step S202. Further, an examination is made in a step S203 whether or not the selected block contains a user-readable comment in the attribute, and if the result of the step S203 is YES, an examination is made in a step S204 whether or not the content of the user-readable comment represents the logical relationship of the selected block to other blocks. If the result of the discrimination in the step S204 is YES, the attribute is transferred to the editing application program in a step S205 as the information indicative of the relationship of the selected block to other blocks.

When the processing for a selected block is completed, an examination is made whether or not the processing for the entire blocks are completed for selected page in a step S206. If the result of the step S206 is NO, the process returns to a step S202 and the processing steps S203–S205 are repeated.

Further, when the result of the step S206 is YES, an examination is made in a step S207 whether or not the processing is completed for the entire page of the document. If the result of the step S207 is NO, the process returns to the step S201 and a next page is selected. When the result of the step S207 is YES, on the other hand, the process of FIG. 8 is terminated.

In the process of FIG. 8, one can set the logical relationship between the blocks based upon the content of the user-readable comment attached to each of the blocks.

Figure 9:
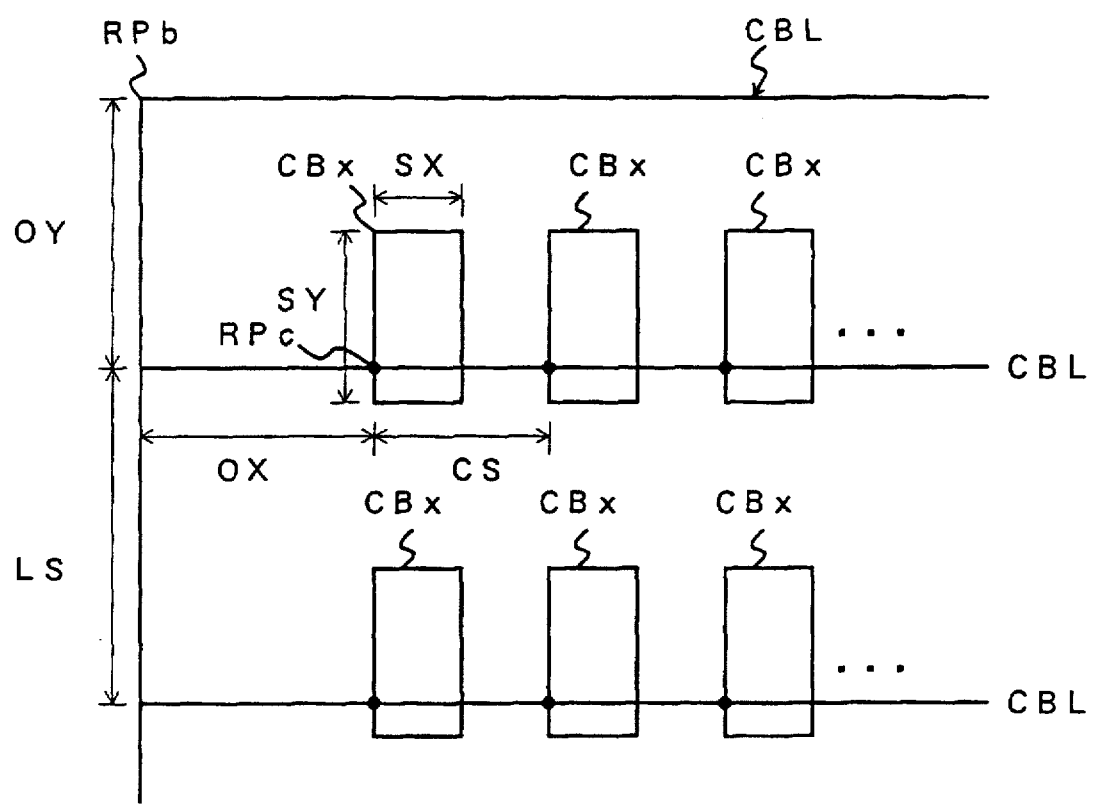
FIG. 9 is a diagram for explaining the concept of attribute of character blocks.

FIG. 9 shows an example of a character block CBL that is included in a page of the document of the CCITT-defined open document architecture. Referring to FIG. 9, it will be noted that the character block CBL is defined by various parameters such as: the coordinate of a reference point RPb of the character block CBL; a horizontal initial offset OX and a vertical initial offset Oy respectively representing the horizontal and vertical positions of the first character box CBx included in the character block CBL; a line spacing LS given as a separation between two vertically adjacent character base lines, the character base line being defined as a line connecting the reference points RPc of the character boxes CBx aligned in the horizontal direction: a character spacing CS given as a separation of the reference points RPb for two horizontally aligned character boxes CBx; and various other attributes related to the layout such as the horizontal as well as vertical sizes of the character block CBL. In the illustrated example, the horizontal size SX and the vertical size SY of the character box CBx are constant irrespective of the characters.

Figure 10:
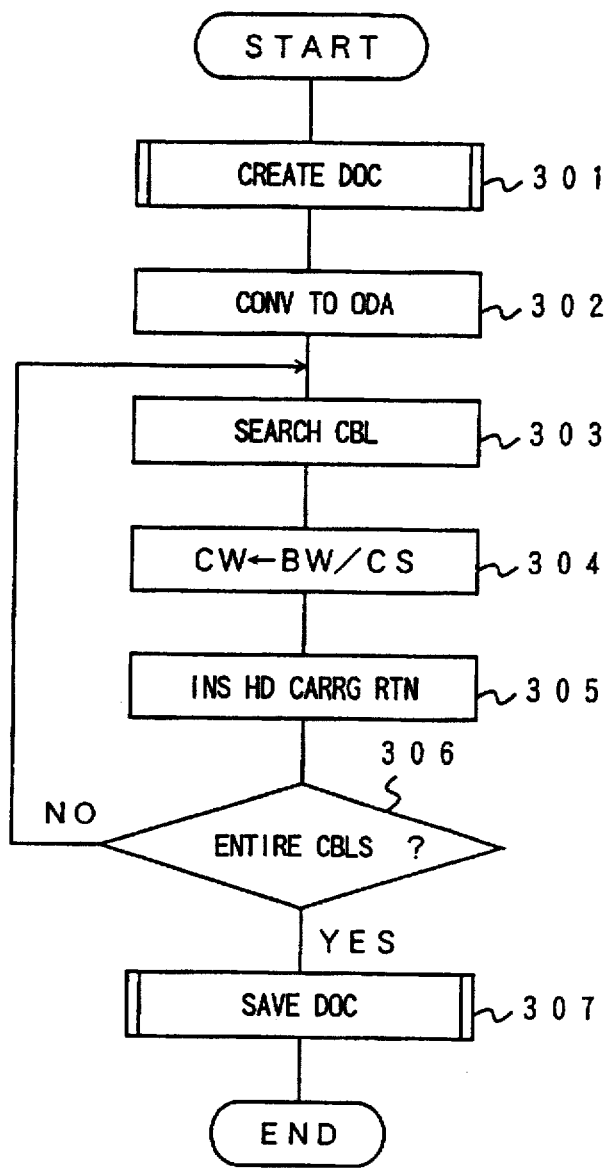
FIG. 10 is a diagram showing an example of processing for saving a created document according to another embodiment of the present invention.

FIG. 10 shows a flowchart conducted in a data terminal in accordance with another embodiment of the present invention.

Referring to FIG. 10, the process of the present embodiment starts with a step S301 wherein an application program for creating and/or editing a document, such as a word processing program, is activated.

Upon completion of editing of the document, the document is saved in the magnetic disk device 12. The data terminal then converts the document thus created or edited into a document of appropriate form of the open document architecture in a step S302.

Next, in a step S303, a character block having the formatted character content architecture is searched for, wherein, in the step S303, a horizontal size BW and a character spacing CS are extracted from the character block thus searched. Further, in a step S304, the size BW is divided by the character spacing CS, and integer part of the remainder is substituted into a parameter CW indicative of the number of characters per line.

Next, in a step S305, a hard carriage return code is inserted into the character data forming the content of the character block in each predetermined number of characters per line represented as CW. As a result of the process of the step S305, a character block having the formatted character content architecture is obtained.

Next, an examination is made whether or not the processing of the steps S303–S305 has been completed for each of the character blocks in a step S306, and if the result is NO, the process returns to the step S303. Thereby, the steps S303–S305 are repeated for the next character block CBL. On the other hand, when the result of the step S306 is YES, the document thus converted is saved in the magnetic disk device 12 as the created or edited document data.

In the present embodiment, it will be noted that one can insert the hard carriage return into the content part of the character blook of the created document in correspondence to the location of the carriage return. Thereby, the character blocks of the formatted character content architecture are created efficiently.

FIG. 8 shows a flowchart corresponding to another embodiment of the present invention. More specifically, FIG. 11 shows a process conducted prior to the process for re-editing a document that has been created and saved subsequently into the magnetic storage device 12 according to tee process of FIG. 10 or a document that has been transmitted from other data terminals end saved subsequently in the magnetic storage device 12.

Figure 11:
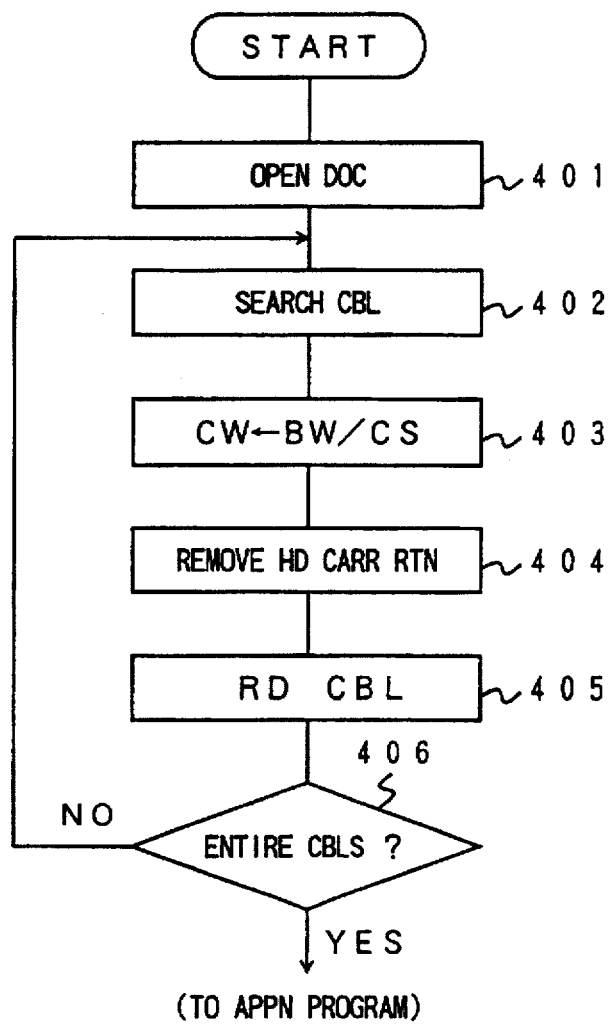
FIG. 11 is a flowchart showing an example of the preprocessing when re-editing a document created according to the process of FIG. 10.

Referring to FIG. 11, the process starts with a step S401 for opening a specified document, and a character block having the formatted character content architecture is selected in a step S402. Further, the horizontal size BW and the character spacing CS are extracted from the selected character block, and the horizontal size BW is divided by the character spacing CW. Thereby, the integer part of the remainder thus obtained is substituted into the parameter CW as the number of the characters per line, in a step S403.

Further, in a step S404, the hard carriage return codes are removed from the character data of the content part of the character block in every character interval specified by CW in a step S404, and the content of the character block, from which the hard carriage return code is thus removed, is read in a step S405.

When the foregoing process of the steps S402–S405 has been completed for the selected block, an examination is made in a step S406 whether or not the process of the steps S402–S405 has been completed for the entire character blocks, and if the result of the step S406 is NO, the process returns to the step S402 and the next block is selected. On the other hand when the result of the step S406 is YES, the editing of the document that has been opened in the step S401 is activated.

In the present embodiment, it will be noted that the hard carriage return code is removed when the document is opened. Therefore, the user of the terminal can readily re-edit the document without removing the hard carriage code manually. Thereby, the efficiency of editing a document is substantially improved.

In the foregoing description, it will be noted that the location of the hard carriage return code is determined in correspondence to the number of characters per line CW that in turn is calculated based upon the horizontal size BW of the character block and the character spacing CS. In the alphabetical documents such as an English document that applies word-wrap or hyphenation to the text, there may be cases wherein the calculated location of the hard carriage return code is different from the actual location of the hard carriage return. In such a case, the hard carriage return code is inserted into the location of the character data specified by the ward-wrap or hyphenation process when saving the document. When editing the document, on the other hand, the hard carriage return code is searched for about the location specified by the parameter CW for a predetermined range specified by the number of characters. The hard carriage return code thus found is subsequently removed.

Further, the present invention is not limited to the embodiments described heretofore, but various variations and modifications may be made without departing from the scope of the invention.

What is claimed is:

1. A method for controlling a mixed mode ISDN communications terminal for transmitting and receiving documents in accordance with an open document architecture, said documents containing one or more pages, each of said pages containing one or more layout components, said method comprising:

selecting one page from a document being created;

selecting a layout component from said one page in said document being created, said selected layout component constituting a hierarchical component for said one page of said document;

examining whether or not said selected layout component has a logical relationship with respect to another layout component in said one page;

setting a character string indicative of said logical relationship in said one page such that said character string is set in an attribute of said selected layout component in a form of user-readable comments that may be read by a user, when said logical relationship exists;

repeating said steps of examining said logical relationship of said selected layout component with respect to another layout component and setting a character string in an attribute of said selected layout component for all other layout components in said one page of said document;

repeating said steps of examining said logical relationship of said selected layout component with respect to another layout component and setting a character string in an attribute of said selected layout component for layout components in all other pages of said document; and editing and re-editing a layout component selected to be edited in accordance with a content of said character string.

2. A method as claimed in claim 1, wherein said character string represents a logical relationship of said selected layout component with respect to a plurality of other layout components included in said one page.

3. A method as claimed in claim 2, wherein said layout component comprises a block forming a hierarchical component below a frame, said frame also forming a hierarchical component of said document.

4. A method as claimed in claim 1, wherein said character string represents a physical, positional relationship of said selected layout component with respect to a plurality of other layout components included in said one page.

5. A method as claimed in claim 4, wherein said layout component comprises a block forming a hierarchical component of said open document architecture at a hierarchical level immediately above a content of said document.

6. A method as claimed in claim 4, wherein said layout component comprises a block forming a hierarchical component below a frame, said frame also forming a hierarchical component of said document.

7. A method as claimed in claim 1, wherein said layout component comprises a block forming a hierarchical component of said open document architecture at a hierarchical level immediately above a content part of said document.

8. A method as claimed in claim 1, wherein said layout component comprises a block forming a hierarchical component at a hierarchical level below a frame, said frame also forming a hierarchical component of said document.

9. A method as claimed in claim 2, wherein said layout component comprises a block forming a hierarchical component of said open document architecture at a hierarchical level immediately above a content of said document.

10. A method for controlling a document creation apparatus, comprising the steps of:

editing a document; and after editing said document, performing the steps of:

(a) formatting said document in accordance with a document application profile that belongs to an open document architecture, said document containing one or more character blocks having a formatted character content architecture that belongs to said document application profile;

(b) locating a character block within said document, said character block containing a character data train representing characters and having a predetermined size and a predetermined character spacing defined in a direction of alignment of characters in said character block;

(c) determining an interval of characters defined for said character block in accordance with said predetermined size of said character block and said predetermined character spacing in said character block; and (d) inserting a predetermined hard carriage return code into said character data train at said interval of characters.

11. A method as claimed in claim 10, further comprising the step of saving said document, wherein said steps (a)–(d) are performed when saving said document in said storage device.

12. A method for controlling a document creation apparatus, comprising the steps of:

editing a document created in accordance with a document application profile that belongs to an open document architecture, said document containing one or more character blocks having formatted character content architecture that belongs to said document application profile;

before editing said document, performing the steps of:

(a) locating a character block within said document, said character block containing a character data train representing characters and having a predetermined size and a predetermined character spacing defined in a direction of alignment of characters in said character block;

(b) determining an interval of characters defined for said character block in accordance with said predetermined size of said character block and said predetermined character spacing in said character block; and (c) removing a hard carriage return code from said character data train, said hard carriage return code having been inserted into said character data train at said interval of characters.

13. A method as claimed in claim 12, further comprising the step of reading said document wherein said steps (a)–(c) are performed before starting reading of said document as a preliminary process.

14. A method for controlling a document creation apparatus, comprising the steps of:

editing a document in accordance with a document application profile that belongs to an open document architecture, said document containing a character block of one or more character blocks having a formatted character content architecture that belongs to said document application profile, said character block containing a character data train representing characters, said character blocks having a predetermined size and a predetermined character spacing defined in a direction of alignment of characters in said character block;

after editing said document performing the steps of:

(a) locating said character block;

(b) determining an interval of characters defined for said character block in accordance with said predetermined size of said character block and said predetermined character spacing in said character block; and (c) inserting a predetermined hard carriage return code into said character data train at said interval of characters;

re-editing said document; and removing the hard carriage return code from said character data train when re-editing said document.

* * * * *